(12) United States Patent
Tateishi

(10) Patent No.: US 6,920,096 B2
(45) Date of Patent: Jul. 19, 2005

(54) ROTATION CONTROLLING APPARATUS FOR OPTICAL RECORDING MEDIUM

(75) Inventor: Kiyoshi Tateishi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 494 days.

(21) Appl. No.: 10/104,064

(22) Filed: Mar. 25, 2002

(65) Prior Publication Data

US 2002/0159351 A1 Oct. 31, 2002

(30) Foreign Application Priority Data

Mar. 30, 2001 (JP) ........................................ 2001-099728

(51) Int. Cl.$^7$ ................................................. G11B 5/09
(52) U.S. Cl. .................................... 369/47.48; 369/53.3
(58) Field of Search ........................... 369/44.13, 47.38, 369/47.39, 47.46, 47.48, 47.55, 53.3, 53.37

(56) References Cited

U.S. PATENT DOCUMENTS 5,495,465 A * 2/1996 Arisaka .................... 369/47.48
5,848,050 A * 12/1998 Nagasawa et al. ....... 369/275.4

* cited by examiner

Primary Examiner—Paul W. Huber
(74) Attorney, Agent, or Firm—Morgan, Lewis & Bockius LLP (57) ABSTRACT

An rotation speed controlling apparatus of an optical recording medium having a wobbled track includes an optical pickup for irradiating a light beam to generate a reading signal according to a wobbling shape of the track; a filter having a predetermined frequency band to pass a wobble reference frequency therethrough for extracting a wobble signal from the reading signal; a generator for generating a wobble reference signal; a detector for detecting the difference between the wobble signal frequency and the wobble reference frequency; a controller for controlling the rotation speed on the basis of the difference between the frequency of the extracted wobble signal and the wobble reference frequency; and a discriminator for discriminating that the wobble signal frequency lies outside the frequency band of the filter; wherein the controller controls the rotation speed in accordance with the detected frequency difference when the wobble signal frequency lies outside the frequency band of the filter.

13 Claims, 12 Drawing Sheets

ROTATION CONTROLLING APPARATUS FOR OPTICAL RECORDING MEDIUM

BACKGROUND OF THE INVENTION

1. Field of the Invention

The present invention relates to an apparatus for controlling the rotating speed of an optical recording medium, and particularly relates to a rotation speed controller of the recording medium having a track with wobbling.

2. Description of the Related Art

There are optical discs such as a CD (Compact Disc) and a DVD (Digital Video Disc or Digital Versatile Disc) as information recording media for optically recording and reproducing information. Research and development are in progress for increasing recording density of such recording discs while developing recording and/or reproducing apparatus for use with the optical discs.

Figure 1:
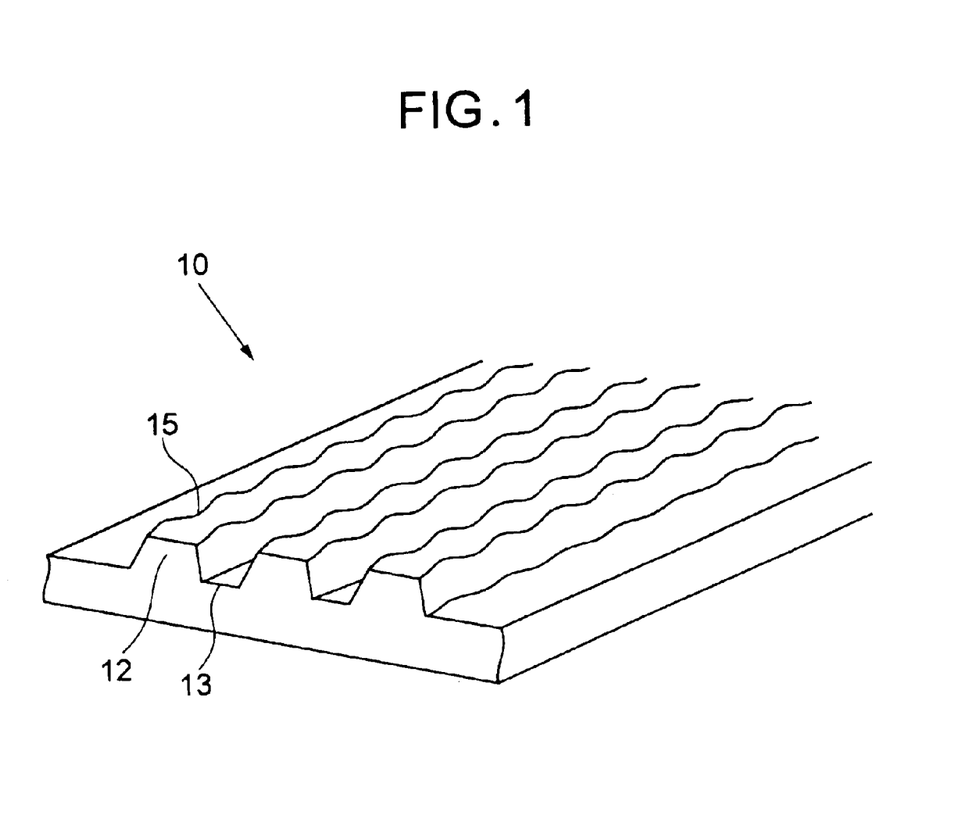
FIG. 1 is a perspective view schematically showing one example of an optical disc having a track formed with wobbling.

FIG. 1 is a perspective view showing one example of the optical disc. A groove track 12 for recording information data and a land track 13 for guiding a light beam such as a laser beam as recording light or reproducing light to the groove track 12 are formed on an optical disc 10. In the following description, for brevity of the explanation, the groove track 12 recording data thereto is simply called the track 12.

Both side walls of the track 12 are formed in a zigzag shape. More particularly, wobbling 15 is performed in the track 12 at a frequency corresponding to a rotation speed of the disc. The wobbling of the track 12 is formed in advance before the shipment of the optical disc.

When recording information data are recorded to the optical disc 10, a wobble signal is extracted from a reading signal (e.g., a radial push-pull signal when a push-pull method is used) outputted from an optical pickup of the recording/reproducing apparatus. The rotation speed of the optical disc 10 is controlled by comparing a wobbling frequency with a predetermined wobble reference frequency.

Signal-to-noise ratio (S/N) of the wobble signal can be improved by increasing amplitude of the wobbling 15 formed in the track 12. However, it is not preferable to increase the wobbling amplitude since reduction of a track pitch is necessary so as to increase the recording density of the optical disc. Therefore, disc capacity is increased by narrowing the track pitch while reducing the wobbling amplitude to a detectable extent. In this instance, it is necessary to use a band pass filter (BPF) having a narrow frequency band so as to remove noise included in the reading signal (e.g., radial push-pull signal) when the wobble signal is extracted.

When the rotation speed of the optical disc 10 is deviated from a prescribed rotation speed, the frequency of the wobble signal lies outside the frequency band of the BPF so that no wobble signal can be extracted. Therefore, for example, a method for controlling the rotation speed by using FG pulses corresponding to a spindle rotation speed of a motor for rotating the optical disc 10 was conventionally used together.

However, there is a problem that such a method is not suitable for the high density disc in view of accuracy. In particular, with respect to a zone constant linear velocity (ZCLV) disc having a recording area divided into plural zones, prescribed rotation speed may be different for every zone and rotation speed must be constant within the zone. For the ZCLV disc, therefore, rotating control with high accuracy for every zone is required. Specifically, if a reading position is slightly deviated in a radial direction, the rotation speed is different so that the frequency of the wobble signal is out of the frequency band of the BPF. Accordingly, wobble signal can be hardly extracted through the narrow frequency-band BPF. It is necessary, thus, to control the rotation speed with high speed and high accuracy even when the reading position is changed slightly in the radial direction.

OBJECT AND SUMMARY OF THE INVENTION

The present invention has been made in view of the problems mentioned above, and it is an object of the present invention to provide a rotation speed controlling apparatus capable of detecting a wobble signal with high sensitivity and performing control of the rotation speed of a recording medium with high accuracy, high stability and high-speed controllability.

To achieve the object, according to one aspect of the present invention, there is provided an apparatus for controlling the rotation speed of an optical recording medium having a track with wobbling, which comprises an optical pickup for irradiating a light beam to the optical recording medium to generate a reading signal according to a wobbling shape of the track; a wobble signal extracting filter having a predetermined frequency band width to pass a wobble reference frequency therethrough for extracting a wobble signal from the reading signal; a reference signal generator for generating a wobble reference signal having the wobble reference frequency; a detector for detecting the difference between the wobble signal frequency and the wobble reference frequency from the reading signal; a rotation controller for controlling the rotation speed of the optical recording medium on the basis of the difference between the frequency of the extracted wobble signal and the wobble reference frequency; and a discriminator for discriminating that the wobble signal frequency lies outside the frequency band of the wobble signal extracting filter; wherein the rotation controller controls the rotation speed of the optical recording medium in accordance with the frequency difference detected in the detector when it is determined that the wobble signal frequency lies outside the frequency band of the wobble signal extracting filter.

According to another aspect of the present invention, there is provided an apparatus for controlling the rotation speed of an optical recording medium having a track with wobbling, which comprises an optical pickup for irradiating a light beam to the optical recording medium to generate a reading signal according to a wobbling shape of the track; a wobble signal extracting filter having a predetermined frequency band width to pass a wobble reference frequency therethrough for extracting a wobble signal from the reading signal; a reference signal generator for generating a wobble reference signal having the wobble reference frequency; a detector for detecting the difference between the wobble signal frequency and the wobble reference frequency from the reading signal; a rotation controller for controlling the rotation speed of the optical recording medium on the basis of the difference between the frequency of the extracted wobble signal and the wobble reference frequency; and a mode setting generator for setting a coarse adjustment mode and a fine adjustment mode regarding the rotation speed control of the optical recording medium; wherein the rotation controller controls the rotation speed of the optical recording medium in accordance with the frequency difference detected in the detector when the coarse adjustment mode is set.

DETAILED DESCRIPTION OF THE EMBODIMENTS

The embodiments of the present invention will be explained in detail with reference to the drawings. In the figures used in the following explanation, the same reference numerals are designated in substantially equivalent constructional elements.

First Embodiment

Figure 2:
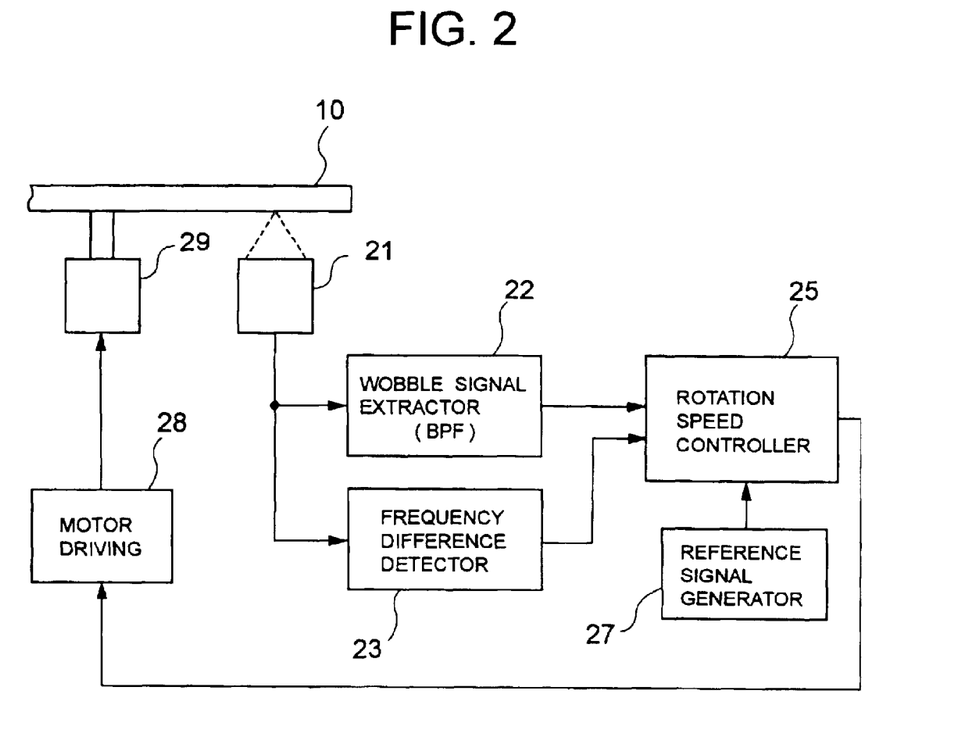
FIG. 2 is a block diagram showing the construction of an optical disc rotation speed controller according to a first embodiment of the present invention.

FIG. 2 is a block diagram showing the construction of an optical disc rotation-speed controlling apparatus 20 according to a first embodiment of the present invention.

A reading signal read with an optical pickup 21 is supplied to a wobble signal extractor 22. In the following explanation, a photo detector (not shown) divided or partitioned in the tangential direction of a track 12 (i.e., on a divisional line parallel to the rotation tangential direction of an optical disc 10) is arranged in the optical pickup 21, and the reading signal (i.e., a radial push-pull signal or simply the push-pull signal) according to a wobbling shape is obtained by using a radial push-pull method (hereinafter, simply referred to as a push-pull method) using the photo detector as an example.

In the wobble signal extractor 22, a wobble signal is extracted from the radial push-pull signal. The wobble signal extractor 22 includes a band pass filter (BPF) having a predetermined narrow frequency band with a predetermined reference frequency (hereinafter, referred to as a wobble reference frequency) of the wobble signal as a center frequency. The wobble signal extractor 22 extracts a frequency component of the wobble signal corresponding to the rotation speed of the disc, i.e., the linear velocity of the track 12.

The push-pull signal from the optical pickup 21 is also supplied to a frequency difference detector 23. The frequency difference detector 23 has a pair of filters (i.e., first and second filters) in which frequency bands lower and higher than the wobble reference frequency are respectively set to passing bands. The frequency difference detector 23 detects the difference between the wobble signal frequency and the wobble reference frequency on the basis of the magnitudes of the respective signals passing through the first and second filters to generate a detecting signal of a magnitude according to the frequency difference. More specifically, for example, when the frequency of the wobble signal within the push-pull signal and the reference frequency are conformed to each other, the frequency difference detector 23 outputs a reference voltage signal of a predetermined magnitude (e.g., a voltage signal of 0 V). Further, the frequency difference detector 23 outputs positive and negative voltage signals according to the detected frequency difference.

Figure 3:
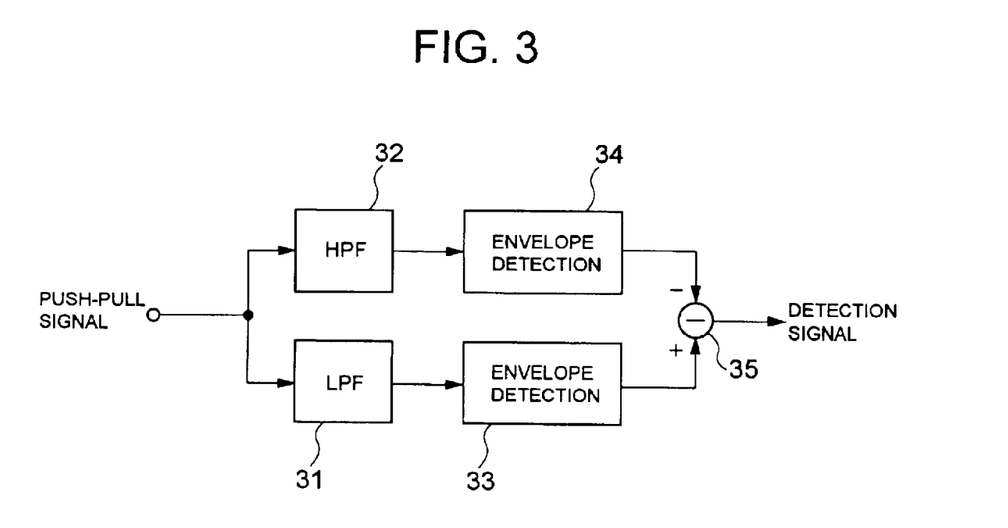
FIG. 3 is a block diagram showing one example of a frequency difference detector.
Figure 4:
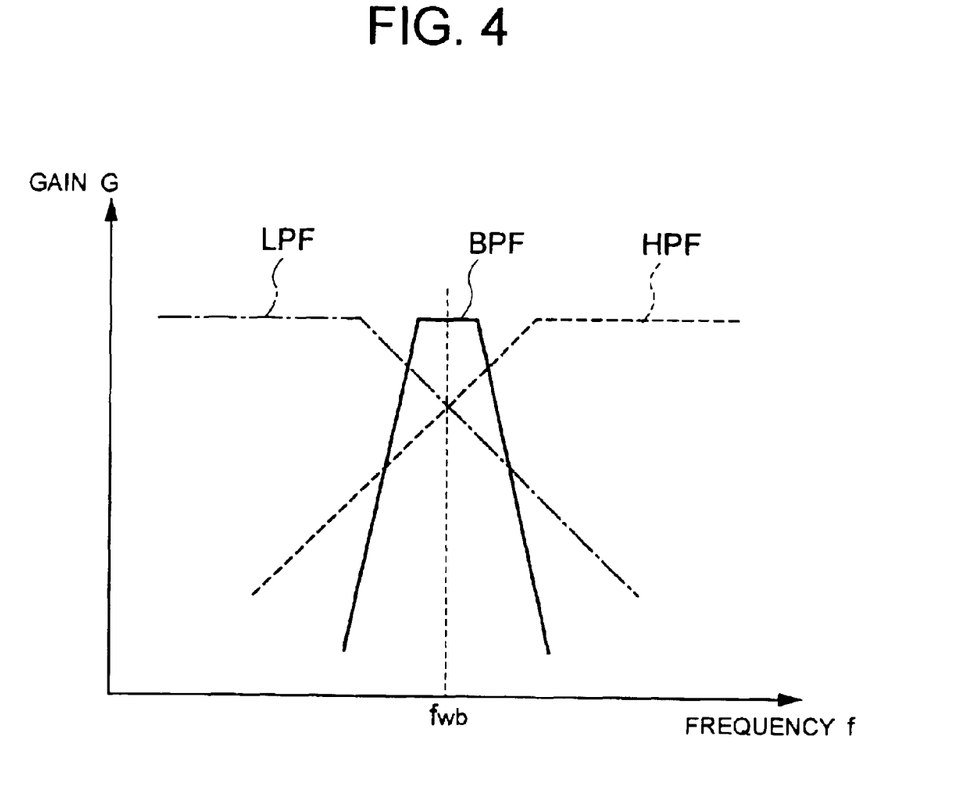
FIG. 4 is a graph showing frequency bands of an LPF and an HPF of the frequency difference detector, and a band pass filter (BPF) provided in a wobble signal extractor.

FIG. 3 is a block diagram showing one example of the frequency difference detector 23. The push-pull signal from the optical pickup 21 is respectively supplied to envelope intensity detectors 33 and 34 via a low pass filter (LPF) 31 (the first filter) and a high pass filter (HPF) 32 (the second filter). FIG. 4 is a graph showing frequency bands of the LPF 31 and the HPF 32, and the band pass filter (BPF) arranged within the wobble signal extractor 22. As mentioned above, the BPF is a narrow band filter in which the wobble reference frequency ($f_{wb}$) is set to a center frequency and the wobble signal of a sufficient S/N (Signal-to-noise ratio) can be extracted. The LPF 31 and the HPF 32 (the first and second filters) used in a coarse adjustment are set such that crossover frequency of these filters falls on the center frequency of the BPF. The intensities (absolute values) of signals extracted in the LPF 31 and the HPF 32 are respectively detected in the envelope detectors 33 and 34. In a subtracter 35, the difference between the absolute values is calculated and is sent as a detecting signal.

A wobble signal frequency component extracted in the wobble signal extractor 22 and a frequency difference detecting signal generated in the frequency difference detector 23 are supplied to a rotation speed controller 25 (hereinafter, simply referred to as a controller). Further, a reference signal generator 27 for generating the wobble reference frequency signal is arranged, and the wobble reference frequency signal is supplied to the controller 25.

The controller 25 includes a phase-locked loop (PLL) circuit for generating a signal according to a phase difference (or a frequency difference) between the wobble-signal frequency signal and the reference frequency signal to control the rotation speed of the disc 10.

More particularly, when the controller 25 determines that the magnitude of the frequency difference detecting signal lies outside a predetermined range, the controller 25 sends a control signal based on the frequency difference detecting signal to a motor driving section 28. Specifically, when the controller 25 determines that the wobble signal frequency lies outside the frequency band of the wobble signal extractor (BPF) 22, the controller 25 sends a signal according to the frequency difference. In other words, the controller 25 sends a control signal for making an adjustment (i.e., coarse adjustment) such that the wobble signal frequency approaches the reference frequency. The motor driving section 28 coarsely adjusts the spindle rotation speed (or the number of spindle revolutions) of a spindle motor 29 for rotating the disc 10 in accordance with the control signal. Such an operation is performed e.g., at a starting time of the rotation of the disc 10, or mainly at an access to the disc during a recording and/or reproducing operation.

On the other hand, when the magnitude of the frequency difference detecting signal lies within the predetermined range, i.e., when the wobble signal frequency enters into the frequency band of the BPF in the wobble signal extractor 22, the controller 25 sends a control signal for making an adjustment (i.e., fine adjustment) for setting the extracted wobble signal frequency to the reference frequency to the motor driving section 28. The motor driving section 28 finely adjusts the rotation speed of the disc 10 in accordance with the control signal.

A high-performance rotation-speed controlling apparatus can be obtained by the construction. The apparatus is capable of detecting the wobble signal with high accuracy to perform control of the rotation speed of the recording medium with high accuracy, high stability and high-speed controllability.

A feedback control method using the above-mentioned PLL circuit, the reference frequency signal, etc. may be constructed by a generally used method. Each circuit may be also constructed by a digital circuit or an analog circuit. Further, the controller 25 may be also realized by a microprocessor (CPU), an individual circuit block or software, firmware, or combinations of these elements. The frequency difference detector 23 may be also constructed as a digital filter group in which an A/D (analog/digital) converter is included. It is preferable to employ a digital signal processing together with a crystal oscillator since the crossover frequency can be stabilized with high accuracy.

Second Embodiment

Figure 5:
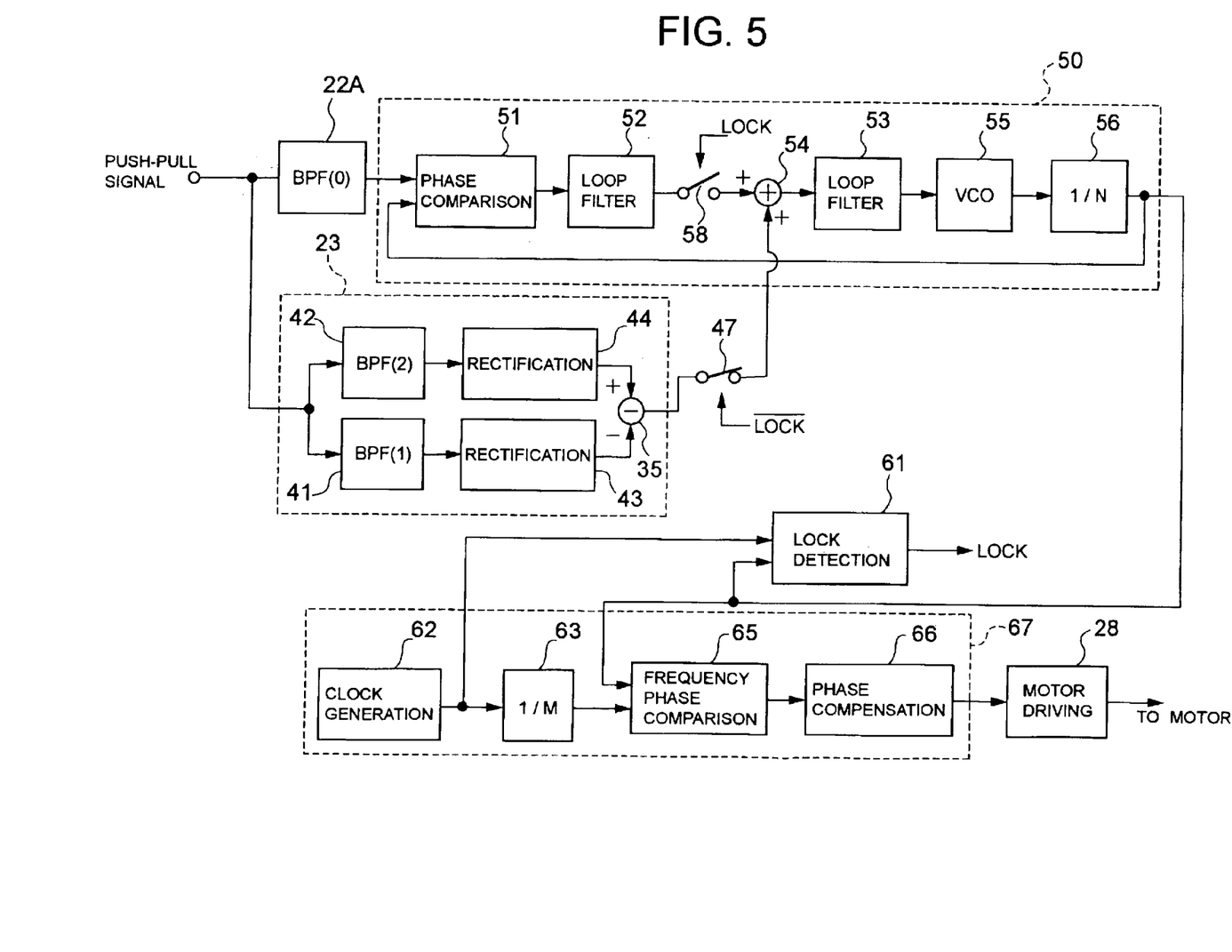
FIG. 5 is a block diagram showing the construction of an optical disc rotation speed controller according to a second embodiment of the present invention.

FIG. 5 is a block diagram showing the construction of an optical disc rotation-speed controlling apparatus 20 according to a second embodiment of the present invention. A push-pull signal from an optical pickup 21 is supplied to a band pass filter (BPF(0)) 22A, and is filtered. The signal filtered by the BPF(0) 22A is supplied to a PLL 50. The PLL 50 has a general circuit configuration. The PLL 50 includes a phase comparator 51, loop filters 52, 53, a voltage control oscillator (VCO) 55 and a fixed (1/N) frequency divider 56 for dividing the frequency of an output signal of the VCO 55 with a predetermined constant frequency dividing ratio. The phase comparator 51 compares the phase of an input wobble signal from the BPF(0) 22A and the phase of an output signal of the 1/N frequency divider 56 to control an oscillating frequency of the VCO 55. In the PLL 50, there is arranged a switch 58 between the loop filter 52 and an adder 54. The adder 54 is arranged between the switch 58 and the loop filter 53. As described later, it is possible to perform a switching operation with respect to rotation control based on the detecting signal of a frequency difference detector 23. The loop filter 53 after the addition is arranged such that the loop filter 53 can smoothly execute a mode transition. No step operation is caused during a transition.

Figure 6:
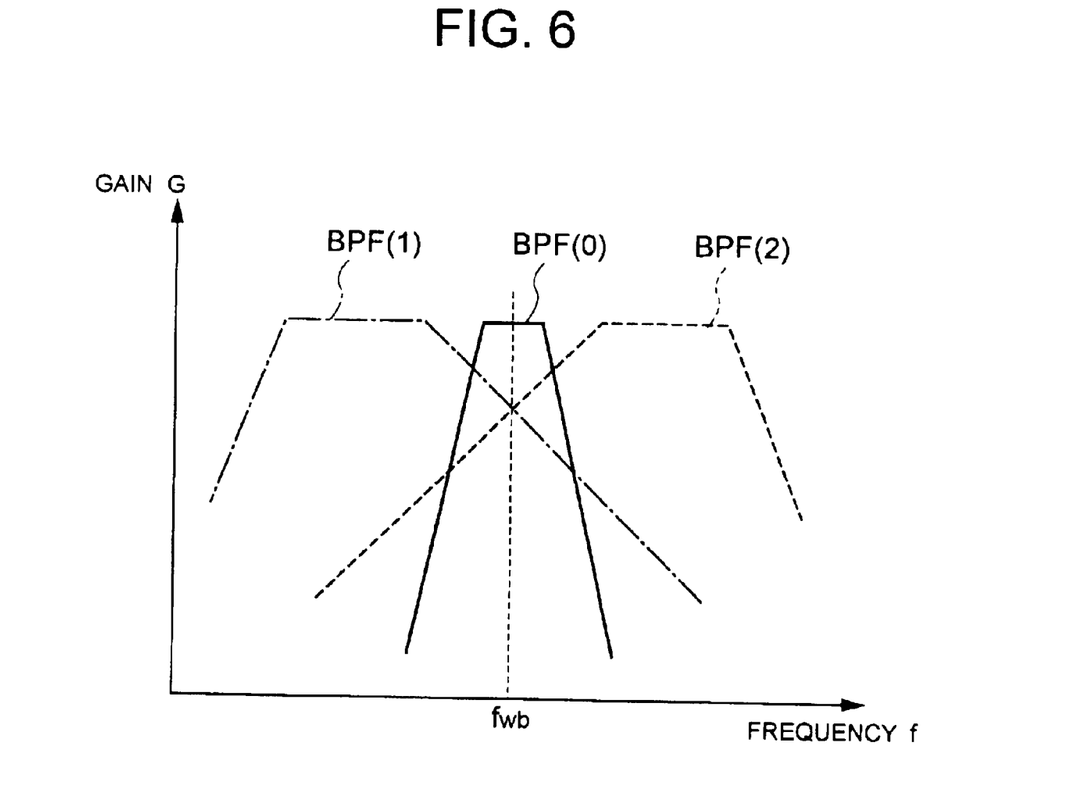
FIG. 6 is a graph showing frequency bands of BPF(0) shown in FIG. 5, a first filter BPF(1) and a second filter BPF(2) of the frequency difference detector.

The push-pull signal from the optical pickup 21 is also supplied to the frequency difference detector 23. The frequency difference detector 23 includes a pair of band pass filters, i.e., a first filter (BPF(1)) 41 and a second filter (BPF(2)) 42. As schematically shown in FIG. 6, the BPF(1) 41 and the BPF(2) 42 respectively have frequency bands lower and higher than the wobble reference frequency ($f_{wb}$) as passing bands. Damping amounts of the BPF(1) 41 and the BPF(2) 42 are set such that the damping amounts are substantially the same to each other at the wobble reference frequency ($f_{wb}$) There is an advantage in that noise components on a low frequency band side of the first filter and a high frequency band side of the second filter can be reduced in comparison with the first embodiment by using the BPFs instead of the LPF and the HPF as a pair of filters of the frequency difference detector 23. For example, the wobble reference frequency ($f_{wb}$) is set to about several hundred kHz, and the frequency bands of the BPF(1) 41 and the BPF(2) 42 are determined in accordance with the frequency components of noises. A disc noise, a tracking residual error, etc. are considered in a low frequency band noise of the BPF(1) 41. A system noise and a laser noise are considered in a high frequency band noise of the BPF(2) 42.

Signals filtered by the BPF(1) 41 and the BPF(2) 42 are respectively supplied to rectifying circuits 43, 44. The signals are rectified by the rectifying circuits 43, 44 and the absolute values of signal intensities are detected. The difference between the absolute values is calculated in a subtracter 35, and a detecting signal is generated. The detecting signal is supplied to the adder 54 in the PLL 50 through a switch 47.

The frequency difference detector 23 is designed such that the frequency difference detector 23 outputs a voltage signal of e.g. 0 volt (V) when the wobble signal frequency is substantially conformed to the wobble reference frequency ($f_{wb}$) When the wobble signal frequency is lower than the wobble reference frequency ($f_{wb}$) (i.e., when a spindle rotation speed is low), the frequency difference detector 23 outputs a negative voltage. In contrast to this, when the wobble signal frequency is higher than the wobble reference frequency ($f_{wb}$)(i.e., when the spindle rotation speed is high), the frequency difference detector 23 outputs a positive voltage.

An output signal of the PLL 50 is supplied to a spindle control section 67 including a clock generator 62, a 1/M frequency divider 63, a frequency phase comparator 65 and a phase compensator 66. A divided clock signal obtained by dividing the frequency of a clock signal of the clock generator 62 in the 1/M frequency divider 63 is supplied to the frequency phase comparator 65. The divided clock signal corresponds to a spindle reference frequency. The frequency phase comparator 65 compares frequency phases of the output signal of the PLL 50 and the divided clock signal. The phase compensator 66 makes a phase compensation based on the comparison result. A phase compensation signal from the phase compensator 66 is sent to the motor driving section 28 so that feedback control of the spindle rotation speed is performed. More specifically, when a frequency component of the BPF(1) 41 on a low frequency side is larger than that of the BPF(2) 42 on a high frequency side in the frequency difference detector 23, the output frequency of the PLL 50 is lower than the spindle reference frequency so that the spindle is accelerated. In contrast to this, when the frequency component of the BPF(2) 42 on the high frequency side is larger than that of the BPF(1) 41, the output frequency of the PLL 50 is higher than the spindle reference frequency so that the spindle is decelerated through negative feedback.

In a lock detecting circuit 61, a lock detecting signal is generated by using the clock signal from the clock generator 62 and the output signal of the PLL 50. The lock detecting signal have two values corresponding to "lock" and "unlock". The switch 58 is closed and the switch 47 is opened in a "lock" state. On the other hand, in an "unlock" state, the switch 58 is opened and the switch 47 is closed (a state shown in FIG. 5). The switching control of a coarse adjustment mode and a fine adjustment mode of the rotation control is performed by the lock detecting signal. A control operation of the rotation speed of the disc 10 will next be explained in detail with reference to a flow chart shown in FIG. 7.

Figure 7:
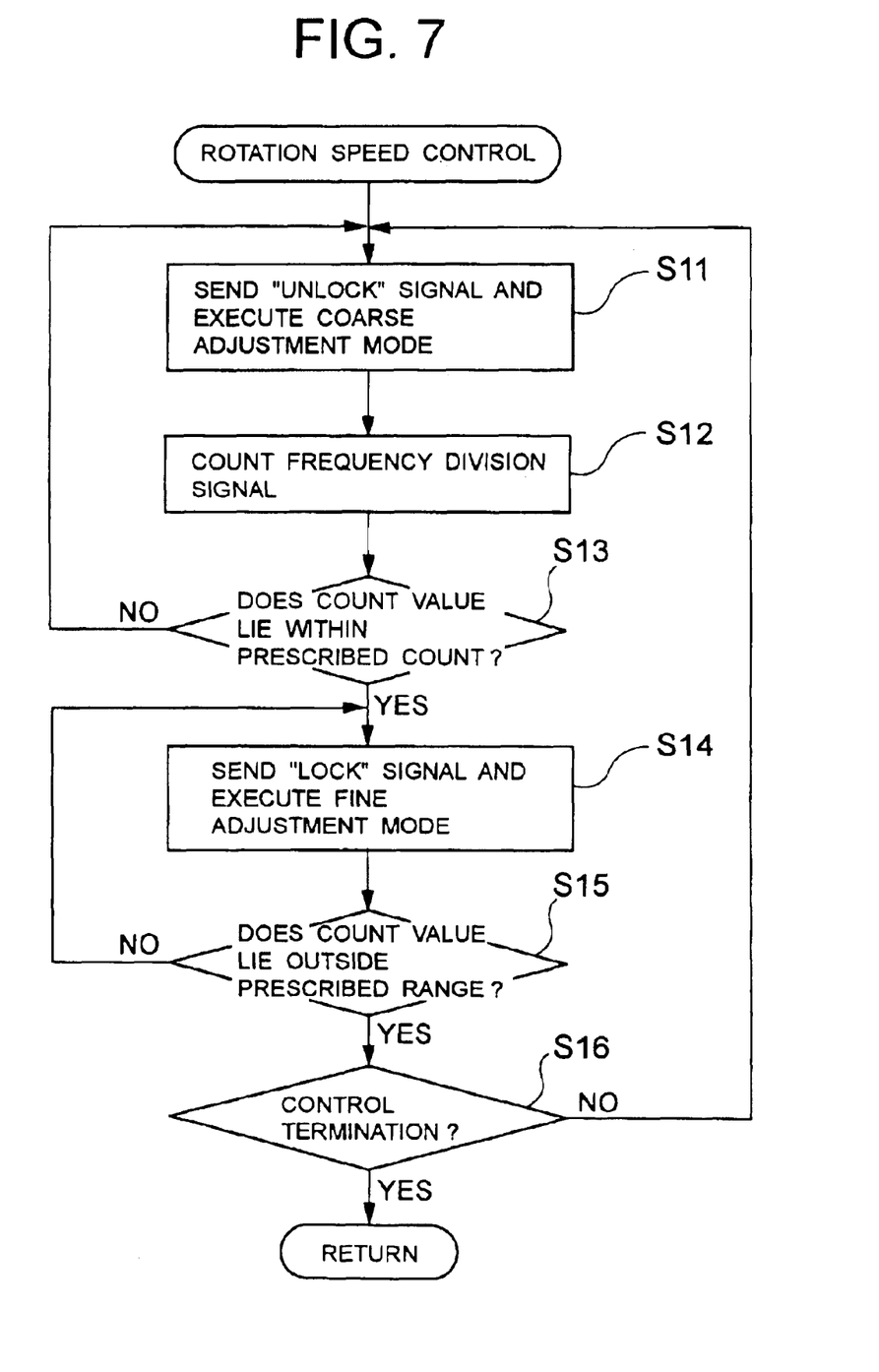
FIG. 7 is a flow chart showing the procedure of a control operation of the rotation speed of the disc.

The control is started in the coarse adjustment mode upon access to the disc 10, starting up of the apparatus, etc. (step S11). Specifically, the lock detecting circuit 61 sends an "unlock" signal as the lock detecting signal, and the VCO 55 is operated through the loop filter 53 by using a frequency difference detecting signal of the wobble signal frequency from the frequency difference detector 23. Accordingly, the oscillating frequency of the VCO 55 is varied in accordance with the detecting signal from the frequency difference detector 23.

The lock detecting circuit 61 counts a frequency division signal obtained by dividing the oscillating frequency of the VCO 55 by the 1/N frequency divider using the clock signal from the clock generator 62 as a clock (step S12). In the lock detecting circuit 61, it is determined whether the count value lies within a prescribed value range or not (step S13). The prescribed value corresponds to the wobble signal frequency, and is set to a value able to discriminate whether the wobble signal frequency enters into the frequency band of the BPF(0) 22A or not. When the count lies outside the prescribed value, control is returned to the step S11 and the coarse adjustment mode is continued. on the contrary, when it is determined that the count lies within the prescribed value, the lock detecting circuit 61 sends a "lock" signal. Thus, the switch 58 is closed and the switch 47 is opened, and the control is switched to the rotation speed control (fine adjustment mode) performed on the basis of the wobble signal frequency passing through the BPF(0) 22A (step S14). When it is transferred to the fine adjustment mode, the VCO 55 is operated by an output of the loop filter 52 and the rotation speed control using the normal PLL loop is executed. In accordance with this embodiment, since the spindle control is performed through the VCO 55 of the PLL loop, pulling-in of the PLL at a transferring to the fine adjustment mode can be performed very quickly.

After it is transferred to the fine adjustment mode, it determined whether the counting value lies within the prescribed range in the lock detecting circuit 61 or not (step S15). When it is determined that the counting value lies within the prescribed range, the control is continued in the fine adjustment mode. On the contrary, when it is determined that the counting value lies outside the prescribed range, it is further determined whether the rotation speed control is terminated or not (step S16). When it is determined that the rotation speed control is not terminated, control is returned to the step S11 to be transferred to the coarse adjustment mode, and the above-mentioned steps are repeated. In the step S16, control quits the subroutine when it is determined that the rotation speed control is terminated.

The switching control between the coarse adjustment and fine adjustment mode of the rotation speed of the disc 10 is performed by the above-mentioned procedure.

Thus, a high-performance rotation-speed controlling apparatus can be obtained by the above-mentioned configuration. The controlling apparatus is capable of performing control of the rotation speed of a recording medium with high accuracy, high stability and high-speed controllability.

Figure 8:
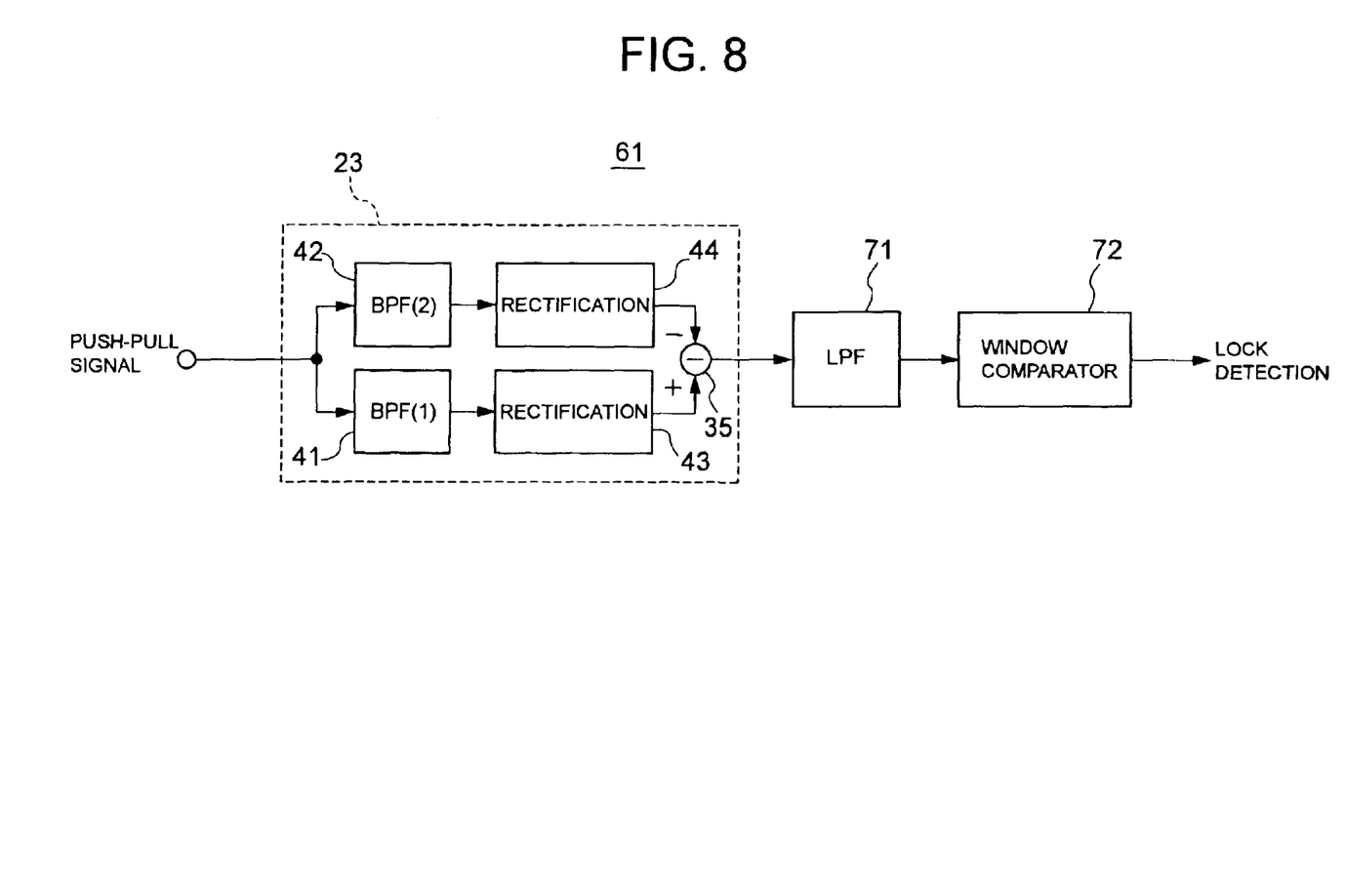
FIG. 8 is a block diagram showing a modified example of a lock detecting circuit.

The lock detecting circuit 61 can be provided in various kinds of constructions. FIG. 8 is a block diagram showing a modified example of the lock detecting circuit 61. The detecting signal in the frequency difference detector 23 is supplied to a window comparator 72 after the detecting signal passes through an LPF 71. In the window comparator 72, it is determined whether the wobble signal frequency lies within a predetermined frequency band (i.e., the frequency band of the BPF 22A for the fine adjustment) or not. More specifically, when the detecting sensitivity of the frequency difference detector 23 is set to e.g., 0.1 (V/kHz) and the frequency band of the BPF(0) 22A is set to ±10 kHz, it can be seen that the wobble signal frequency enters into the frequency band of the BPF(0) 22A if the output voltage of the frequency difference detector 23 lies within ±1 V. Accordingly, if a threshold value of the window comparator 72 is set to ±1 V and the output voltage of the frequency difference detector 23 enters into the range, the PLL loop can be operated in the fine adjustment mode without an error in operation.

Figure 9:
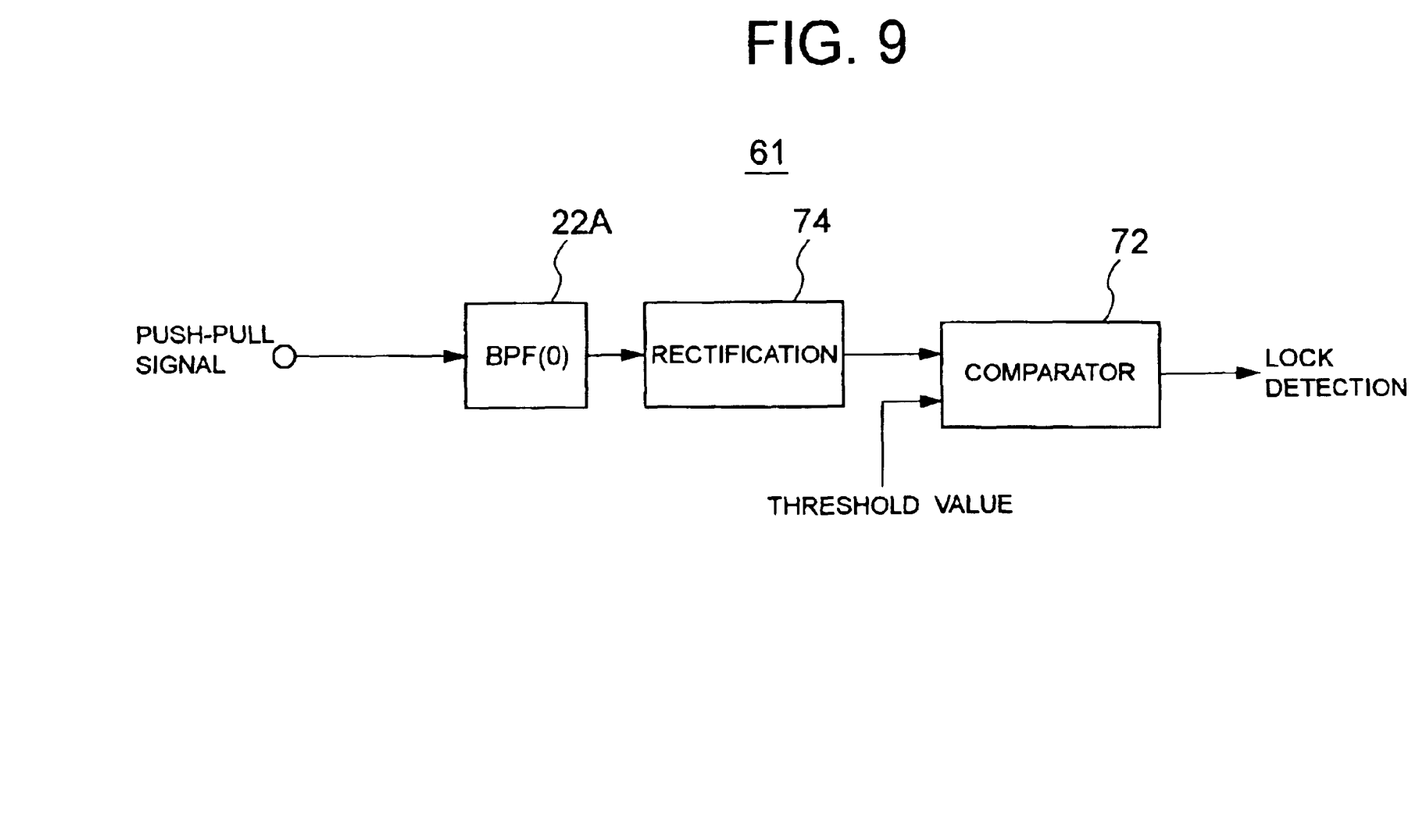
FIG. 9 is a block diagram showing another modified example of the lock detecting circuit.

FIG. 9 is a block diagram showing another modified example of the lock detecting circuit 61. The wobble signal passing through the BPF(0) 22A is rectified by a rectifying circuit 74, and its output magnitude is compared with a threshold value in a comparator 75. When the magnitude of the wobble signal is equal to or greater than the threshold value, it can be seen that the wobble signal frequency enters into the frequency band of the BPF(0) 22A, and a lock signal is outputted as the detecting signal. On the contrary, when magnitude of the wobble signal does not reach the threshold value, an unlock signal is outputted.

Further, in another modified example of the lock detecting circuit 61, the edge interval (i.e., a pulse period) of a frequency division signal obtained by dividing the frequency of a signal of the VCO 55 by the 1/N frequency divider 56 is counted and measured with the clock signal from the clock generator 62. In this case, the lock signal may be also sent if the count lies within a predetermined count value range.

Third Embodiment

Figure 10:
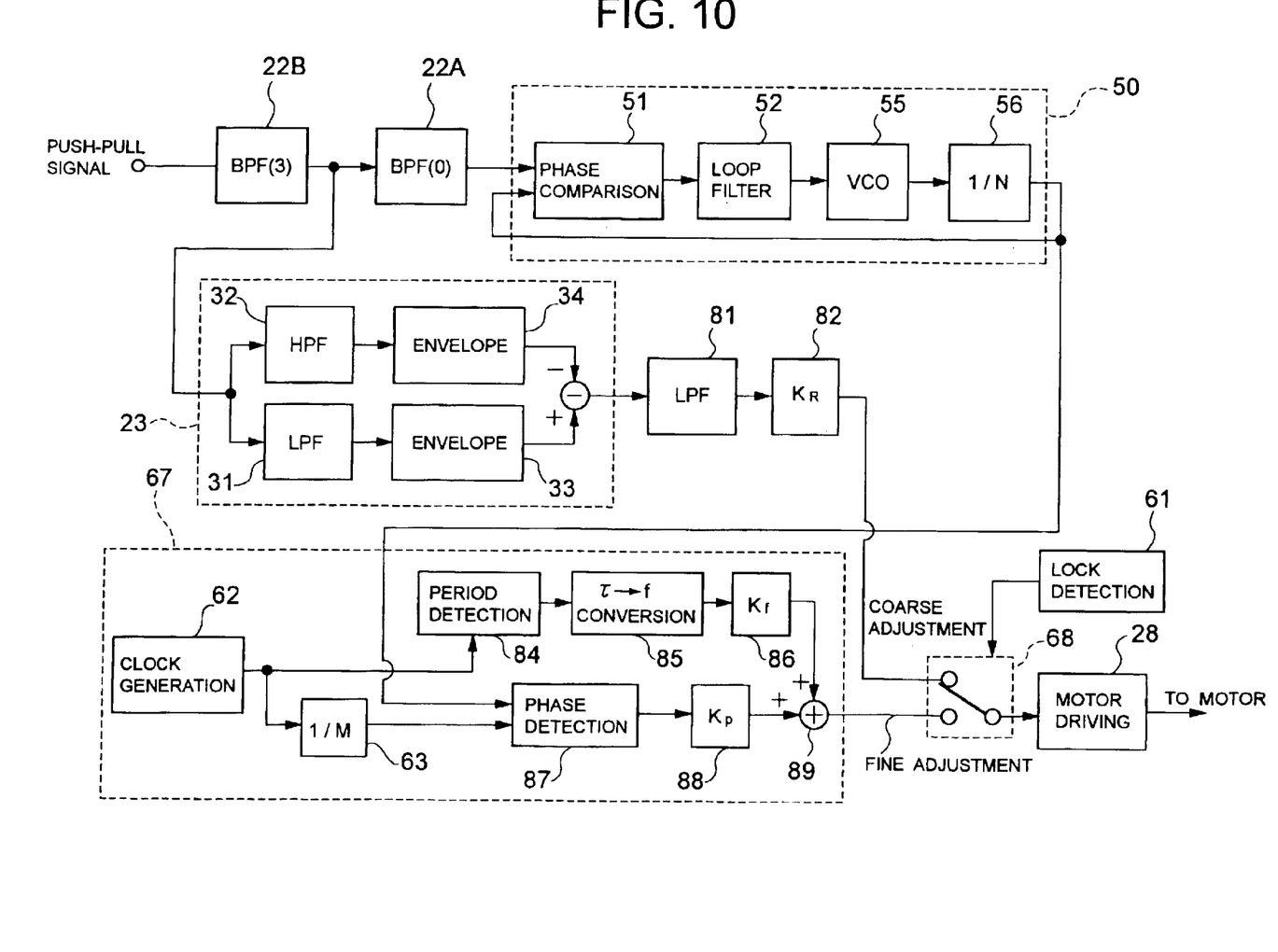
FIG. 10 is a block diagram showing the construction of an optical disc rotation speed controller according to a third embodiment of the present invention.

FIG. 10 is a block diagram showing the construction of an optical disc rotation-speed controlling apparatus 20 according to a third embodiment of the present invention.

Figure 11:
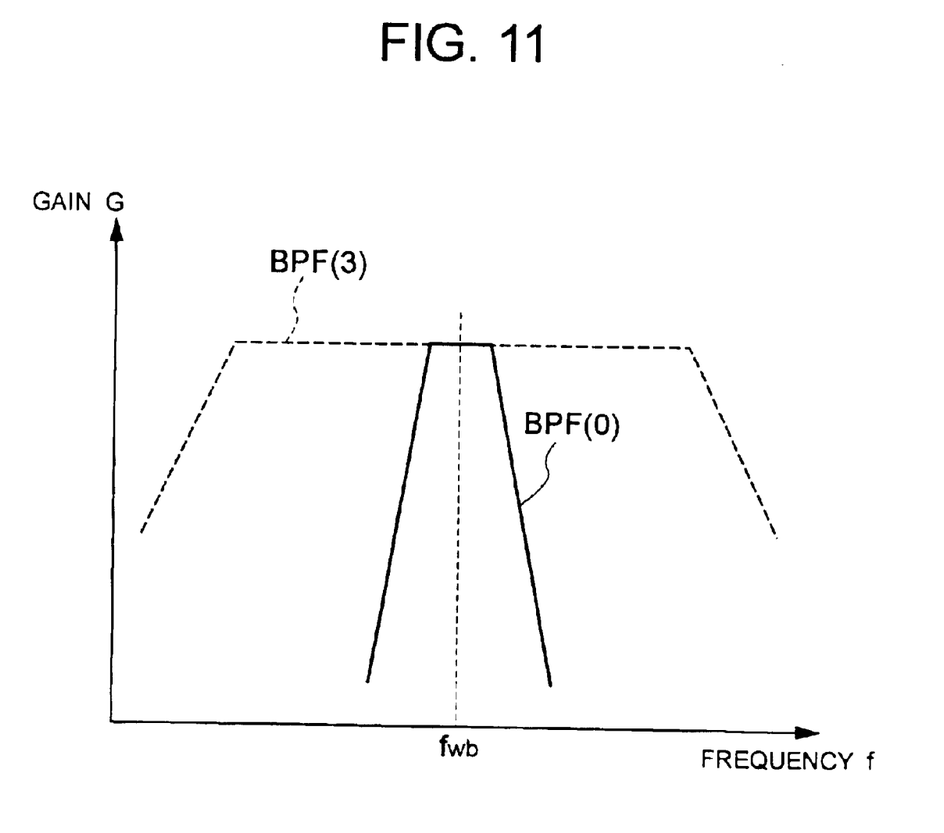
FIG. 11 is a graph showing frequency bands of BPF(0) and BPF(3) shown in FIG. 10.

A push-pull signal from the optical pickup 21 is first filtered in a band pass filter (BPF(3)) 22B, and is then supplied to a band pass filter (BPF(0)) 22A and a frequency difference detector 23. As shown in FIG. 11, the BPF(3) 22B is a band pass filter having a frequency band including a frequency band of the BPF(0) 22A and a wider frequency band than that of the BPF(0) 22A. Thus, it is possible to reduce noise components on low and high frequency band sides.

The frequency difference detector 23 in this embodiment has a construction similar to that of the frequency difference detector 23 shown in FIG. 3. In the second embodiment, the detecting signal of the frequency difference detector 23 is supplied to the PLL circuit 50 and is utilized. However, in this embodiment, the detecting signal of the frequency difference detector 23 is directly used as a spindle motor driving signal in the coarse adjustment mode. More specifically, when the lock detecting signal of a lock detector 61 is set to "unlock", the detecting signal of the frequency difference detector 23 is supplied to an amplifier 82 via an LPF 81 by a switch 68. A signal filtered by the LPF 81 is converted to a signal suitable for a motor driving section 28 by undergoing a gain adjustment in the amplifier 82. Thus, feedback control of the spindle rotation speed (or the number of spindle revolutions) of a motor 29 is performed. More specifically, when the frequency component of an LPF 31 of the frequency difference detector 23 is greater than that of an HPF 32, the spindle is accelerated. On the contrary, the spindle is decelerated when the frequency component of the HPF 32 is larger than that of the LPF 31.

When the lock detecting signal of the lock detector 61 is set to "lock", i.e., in the fine adjustment mode, the output signal of the PLL circuit 50 is supplied to the motor driving section 28 through a spindle control section 67. The period of a frequency division signal of a 1/N frequency divider 56 within the PLL circuit 50 is detected by using the clock of a clock generator 62 in a period detector 84, and the frequency of the frequency division signal is converted by a period/frequency converter 85. The signal converted in frequency is gain-adjusted by a frequency amplifier (Kf) 86. The frequency division signal of the 1/N frequency divider 56 is detected in phase by using the frequency division signal of a 1/M frequency divider 63 in a phase detector 87, and is gain-adjusted by a phase amplifier (Kp) 88. Output signals of the frequency amplifier (Kf) 86 and the phase amplifier (Kp) 88 are added by an adder 89 to be supplied to the motor driving section 28 through a switch 68.

In the embodiment, no PLL circuit 50 is interrupted even during the coarse adjusting mode, and the wobble signal is supplied to the PLL circuit 50. Therefore, stable control is performed even when switching from the coarse adjustment mode to the fine adjustment mode.

Fourth Embodiment

In the foregoing embodiments, the description is made with respect to a configuration in which a determination is made whether or not the wobble signal frequency enters into the frequency band of the narrow band BPF(0) 22A for the fine adjustment, and the coarse adjustment mode and the fine adjustment mode are switched on the basis of the determination result. Such mode switching can be provided by various kinds of methods. An example of a mode switching will next be described with reference to a flow chart shown in FIG. 12 in which the mode switching is performed by time management in the rotation speed control of the disc 10. The construction of the rotation-speed controlling apparatus 20 is similar to that shown in the above-mentioned embodiments, but the controller 25, instead of the lock detector 61, sets the coarse or fine adjustment mode. More specifically, the controller 25 generates a lock detecting signal to control the mode switching. In accordance with the foregoing embodiments, the opening and closing of switches 47 and 58 (FIG. 5) or switch 68 (FIG. 10) are controlled by the controller 25.

Figure 12:
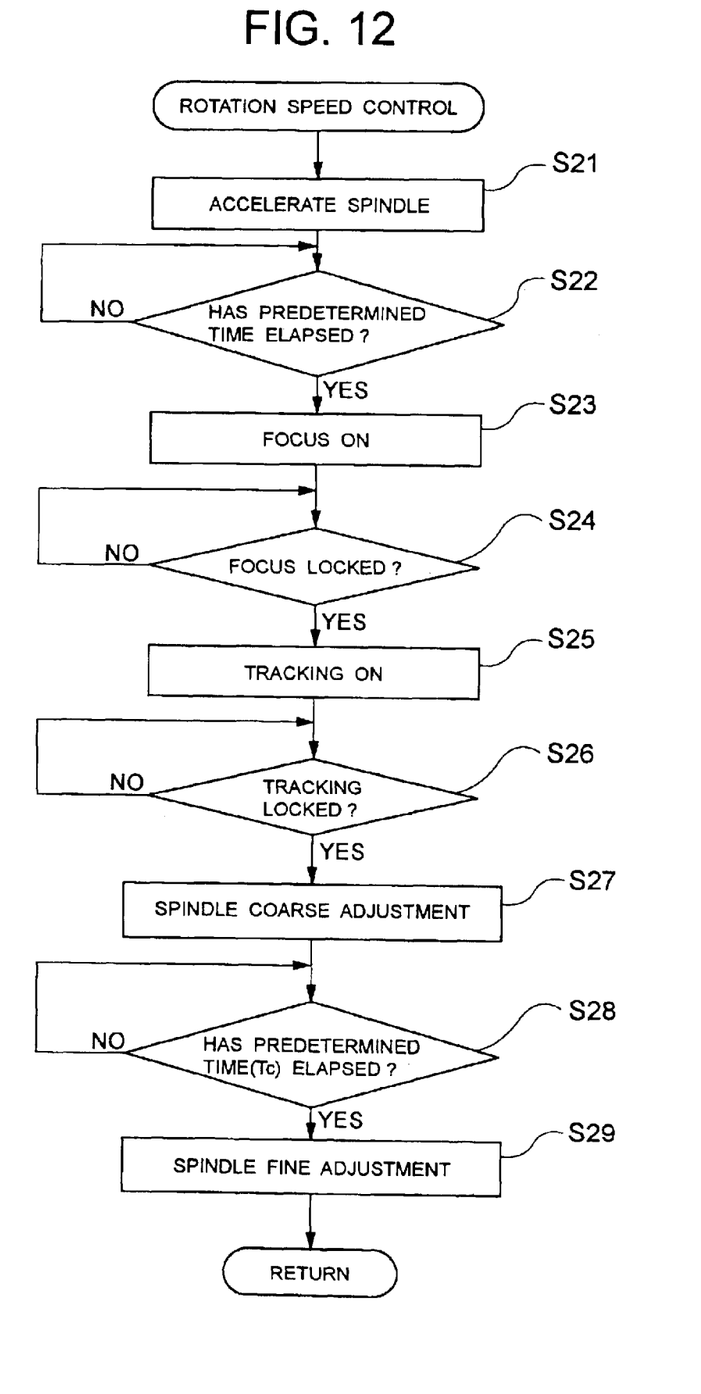
FIG. 12 is a flow chart showing the procedure of a control operation of the disc rotation speed according to a fourth embodiment of the present invention.

The rotation of a spindle is started and accelerated by the motor driving section 28 through a spindle control section 67 upon access to the disc 10, starting up of the apparatus, etc. (step S21). After the rotation of the spindle is started, it is determined whether a predetermined time (e.g., 0.1 second) has elapsed or not (step S22). When it is determined whether the predetermined time has elapsed, a focus servo is started (focus on) (step S23) and it is determined whether a focus is locked or not (step S24). When it is determined that the focus is locked, a tracking servo is started (tracking on) (step S25) and it is further determined whether a tracking is locked or not (step S26).

When it is determined that the tracking is locked, the controller 25 sends an "unlock" signal as the lock detecting signal. Thus, the spindle rotation control is executed in the coarse adjustment mode by using a frequency difference detecting signal of the wobble signal frequency from the frequency difference detector 23 (step S27).

The controller 25 counts a time from the control start in the coarse adjustment mode by a timer (not shown) provided in the controller 25. It is then determined whether a predetermined time ($T_c$, e.g., about 0.1 to 0.2 second) has elapsed from the start of the coarse adjustment mode or not (step S28). When it is determined that the predetermined time has elapsed, the controller 25 sends a "lock" signal as the lock detecting signal. Thus, the spindle rotation control is executed in the fine adjustment mode on the basis of the wobble signal frequency passing through the BPF(0) 22A for the fine adjustment (step S29). The predetermined elapsed time ($T_c$) for transferring the coarse adjustment mode to the fine adjustment mode may be set to a time sufficient to make the wobble signal frequency enter the interior of the frequency band of the BPF(0) 22A by executing the rotation control in the coarse adjustment mode. Further, the predetermined elapsed time ($T_c$) may be suitably determined in accordance with various kinds of parameters such as a disc type, the rotation speed of the disc, the spindle control section and motor performance.

The rotation speed is stably controlled with high speed and high accuracy by such a procedure.

Numeric values, etc. shown in the above-mentioned embodiments are shown as examples. Further, the embodiments can be also applied by suitable modifications or in combination.

As described above in detail, according to the present invention, a high-performance rotation-speed controlling apparatus can be provided. The controlling apparatus has a capability of detecting a wobble signal with high sensitivity and performing control of the rotation speed of a recording medium with high accuracy, high stability and high-speed controllability.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2001-99728 which is hereby incorporated by reference.

What is claimed is:

1. An apparatus for controlling the rotation speed of an optical recording medium having a track with wobbling, comprising:

an optical pickup for irradiating a light beam to said optical recording medium to generate a reading signal according to a wobbling shape of said track;

a wobble signal extracting filter having a predetermined frequency band width to pass a wobble reference frequency therethrough for extracting a wobble signal from said reading signal;

a reference signal generator for generating a wobble reference signal having said wobble reference frequency;

a detector for detecting the difference between the wobble signal frequency and said wobble reference frequency from said reading signal;

a rotation controller for controlling the rotation speed of said optical recording medium on the basis of the difference between the frequency of the extracted wobble signal and said wobble reference frequency; and a discriminator for discriminating that the wobble signal frequency lies outside the frequency band of said wobble signal extracting filter;

wherein said rotation controller controls the rotation speed of said optical recording medium in accordance with the frequency difference detected in said detector when it is determined that said wobble signal frequency lies outside the frequency band of said wobble signal extracting filter.

and wherein said detector includes first and second filters respectively having frequency bands lower and higher than said wobble reference frequency and has a frequency band wider than that of said wobble signal extracting filter to detect said frequency difference on the basis of the magnitude difference between the respective signals filtered by said first and second filters.

2. An apparatus according to claim 1, wherein said rotation controller includes a phase-locked loop circuit having a voltage control oscillator, and controls the rotation speed of said optical recording medium by operating said voltage control oscillator using said magnitude difference when it is determined that said wobble signal frequency lies outside the frequency band of said wobble signal extracting filter.

3. An apparatus according to claim 1, wherein the respective frequency characteristics of said first and second filters are determined such that said magnitude difference becomes a value according to the frequency difference between said wobble signal frequency and said wobble reference frequency.

4. An apparatus according to claim 3, wherein damping amounts of said first and second filters at said wobble reference frequency are substantially equal to each other.

5. An apparatus according to claim 1, wherein said discriminator determines that said wobble signal frequency lies outside the frequency band of said wobble signal extracting filter when an absolute value of said magnitude difference is equal to or greater than a predetermined value.

6. An apparatus according to claim 1, wherein said first and second filters include band pass filters.

7. An apparatus for controlling the rotation speed of an optical recording medium having a track with wobbling, comprising:

an optical pickup for irradiating a light beam to said optical recording medium to generate a reading signal according to a wobbling share of said track;

a wobble signal extracting filter having a predetermined frequency band width to pass a wobble reference frequency therethrough for extracting a wobble signal from said reading signal;

a reference signal generator for generating a wobble reference signal having said wobble reference frequency;

a detector for detecting the difference between the wobble signal frequency and said wobble reference frequency from said reading signal;

a rotation controller for controlling the rotation speed of said optical recording medium on the basis of the difference between the frequency of the extracted wobble signal and said wobble reference frequency; and a mode setting generator for setting a coarse adjustment mode and a fine adjustment mode regarding the rotation speed control of said optical recording medium, wherein said rotation controller controls the rotation speed of said optical recording medium in accordance with the frequency difference detected in said detector when said coarse adjustment mode is set and wherein said detector includes first and second filters respectively having frequency bands lower and higher than said wobble reference frequency and has a frequency band wider than that of said wobble signal extracting filter to detect said frequency difference on the basis of the magnitude difference between the respective signals filtered by said first and second filters.

8. An apparatus according to claim 7, wherein said rotation controller includes a phase-locked loop circuit having a voltage control oscillator, and controls the rotation speed of said optical recording medium by operating said voltage control oscillator using said magnitude difference when said coarse adjustment mode is set.

9. An apparatus according to claim 7, wherein the respective frequency characteristics of said first and second filters are determined such that said magnitude difference becomes a value according to the frequency difference between said wobble signal frequency and said wobble reference frequency.

10. An apparatus according to claim 9, wherein damping amounts of said first and second filters at said wobble reference frequency are substantially equal to each other.

11. An apparatus according to claim 7, wherein said mode setting generator, after said coarse adjustment mode is set, effects a transition to said fine adjustment mode after a predetermined time has elapsed.

12. An apparatus according to claim 7, wherein said first and second filters include band pass filters.

13. An apparatus for controlling the rotation speed of an optical recording medium having a track with wobbling, comprising:

a wobble signal extracting portion for irradiating a light beam to said optical recording medium to extract a wobble signal frequency of said track;

a reference signal generator for generating a wobble reference signal having a wobble reference frequency;

a detector including first and second filters respectively having frequency bands lower and higher than said wobble reference frequency for detecting a magnitude difference between the signals filtered by said first and second filters; and a rotation controller for controlling the rotation speed of said optical recording medium in accordance with the magnitude difference.

* * * * *